United States Patent
Yen

(10) Patent No.: US 8,234,590 B2
(45) Date of Patent: Jul. 31, 2012

(54) METHOD AND APPARATUS FOR DISPLAYING ICON OF MULTIMEDIA FILE, AND RECORDING MEDIUM THEREOF

(75) Inventor: Chia-Fu Yen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 449 days.

(21) Appl. No.: 12/350,923

(22) Filed: Jan. 8, 2009

(65) Prior Publication Data
US 2010/0122217 A1 May 13, 2010

(30) Foreign Application Priority Data
Nov. 7, 2008 (TW) ............................... 97143125 A

(51) Int. Cl.
*G06F 3/048* (2006.01)
(52) U.S. Cl. .................... 715/836; 715/815; 715/835
(58) Field of Classification Search .......... 715/835–839, 715/846–847, 705, 708, 771, 815
See application file for complete search history.

(56) References Cited

U.S. PATENT DOCUMENTS

| | | | | |
|---|---|---|---|---|
| 7,000,196 B2* | 2/2006 | Kobayashi | ..................... | 715/810 |
| 7,137,075 B2* | 11/2006 | Hoshino et al. | ............... | 715/848 |
| 7,782,305 B2* | 8/2010 | Ohira et al. | .................... | 345/169 |
| 7,844,918 B1* | 11/2010 | Ashe | .............................. | 715/838 |
| 2008/0062887 A1* | 3/2008 | Parolkar et al. | ............... | 370/252 |
| 2010/0179991 A1* | 7/2010 | Lorch et al. | .................... | 709/206 |

FOREIGN PATENT DOCUMENTS

| | | |
|---|---|---|
| CN | 101155218 | 4/2008 |
| TW | 200823739 | 6/2008 |
| TW | 200825884 | 6/2008 |
| WO | 2007080559 | 7/2007 |

OTHER PUBLICATIONS

MP3ext, "Icon Handler Detail", http://www.mutschler.de/mp3ext/IconHandler.html, as evidenced by Internet Archive Wayback Machine, Aug. 20, 2007.*
"First Office Action of China Counterpart Application", issued on Feb. 23, 2011, p. 1-p. 4, in which the listed reference was cited.
"Office Action of Taiwan Counterpart Application", issued on May 14, 2012, p1-p6, in which the listed references were cited.
"Icon Handler Detail", Aug. 20, 2007, Available at: http://www.mutschler.de/mp3ext/IconHandler.html.

* cited by examiner

*Primary Examiner* — Robert Stevens
*Assistant Examiner* — Andrew Tank
(74) *Attorney, Agent, or Firm* — Jianq Chyun IP Office

(57) ABSTRACT

A method and an apparatus for displaying an icon of a multimedia file on a user interface, and a recording medium thereof are provided. In the present method, a file quality grade of the multimedia file is obtained first. A resolution of the icon of the multimedia file is subsequently adjusted according to the file quality grade and the adjusted icon is displayed on the user interface. As a result, the user can quickly determine the quality of the multimedia file by determining whether the icon is clear or not, thereby more conveniently opening the multimedia file that meets the file quality requirement.

15 Claims, 3 Drawing Sheets

METHOD AND APPARATUS FOR DISPLAYING ICON OF MULTIMEDIA FILE, AND RECORDING MEDIUM THEREOF

CROSS-REFERENCE TO RELATED APPLICATION

This application claims the priority benefit of Taiwan application serial no., 97143125 filed Nov. 7, 2008. The entirety of the above-mentioned patent application is hereby incorporated by reference herein and made a part of specification.

BACKGROUND OF THE INVENTION

1. Field of the Invention

The present invention generally relates to a method for displaying an icon of a file, and more particularly, to a method and an apparatus for displaying an icon of a multimedia file, and a recording medium thereof.

2. Description of Related Art

In general, when operating a computer with a Windows operating system installed therein, users can view sub-file folders and files of individual file folders through a file folder window. Taking the Windows operating system developed by Microsoft company as an example, to meet users' various needs, it provides various manners of displaying files, such as, thumbnails, tiles, icons, list and detail. Each manner of displaying the files has its own advantages and can provide different file information. For example, the icons displaying manner is a manner in which the representative icon of each file is displayed on the file folder window to facilitate the user identifying a type of the file from the icon. The detail displaying manner is a manner in which file names and icons as well as information such as file sizes and modified dates are displayed for users' reference.

However, no matter which of the above manners is used, the user can only identify the file type through different icons. For files of the same type, their icons displayed on the file folder window are the same and the users cannot obtain information other than the file type directly from the icons. For example, the icons of audio files will not be differentiated by an audio quality of the audio files. Therefore, when the user wishes to choose those files having a better audio quality from a large number of audio files to play, the user needs to switch the file displaying manner to the list displaying manner and determine the audio quality from the file size. The files chosen in this manner does not necessarily meet the audio quality needs. It can also be inconvenient for the user to use the files because the file quality cannot be quickly and intuitively determined.

SUMMARY OF THE INVENTION

Accordingly, the present invention is directed to a method for displaying an icon of a multimedia file which allows the user to determine the file quality grade of the multimedia file from its icon.

The present invention is also directed to an apparatus for displaying an icon of a multimedia file which displays the icon according to the file quality of the multimedia file such that the user can quickly choose multimedia files that meet the file quality requirement from a large number of multimedia files.

The present invention provides a method for displaying an icon of a multimedia file on a user interface. In this method, a file quality grade of the multimedia file is firstly determined. The icon of the multimedia file is adjusted according to the file quality grade and the adjusted icon is displayed on the user interface.

According to one embodiment of the present invention, wherein before the step of determining the file quality grade of the multimedia file, the method further includes providing a file and determining whether the file is the multimedia file. The icon of the file is directly displayed if the file is not the multimedia file. The file is analyzed to initiate determining of the file quality grade if the file is the multimedia file.

According to one embodiment of the present invention, determining the file quality grade of the multimedia file includes identifying a multimedia file type of the multimedia file, obtaining a file information relative to the multimedia file type; and comparing the file information to at least one quality classification threshold to determine the file quality grade corresponding to the file information.

According to one embodiment of the present invention, adjusting and displaying the icon according to the file quality grade includes adjusting a resolution of the icon according to the file quality grade and displaying the adjusted icon on the user interface.

According to one embodiment of the present invention, the multimedia file type includes an audio file, a video file or an image file. The file information includes a bitrate or a pixel.

In another aspect, the present invention provides an apparatus for displaying an icon of a multimedia file. The displaying apparatus includes a display and a processor. The processor includes a quality grade classification module and an icon displaying module. The display is used to present a user interface. The quality grade classification module is used to determine a file quality grade of the multimedia file. The icon displaying module is coupled to the quality grade classification module to adjust the icon of the multimedia file and display the icon on the user interface.

According to one embodiment of the present invention, the processor further includes a multimedia file identification module coupled to the quality grade classification module and the icon displaying module to determine whether the file is a multimedia file. When the multimedia file identification module determines the file is not a multimedia file, the icon displaying module directly displays the icon corresponding to the file. When the multimedia file identification module determines the file is a multimedia file, the quality grade classification module analyzes the file to initiate determining of the file quality grade.

According to one embodiment of the present invention, the quality grade classification module identifies a multimedia file type of the multimedia file, obtains a file information relative to the multimedia file type, and compares the file information to at least one quality grade threshold to determine the file quality grade corresponding to the file information.

According to one embodiment of the present invention, the icon displaying module adjusts a resolution of the icon according to the file quality grade and displays the adjusted icon on the user interface.

According to one embodiment of the present invention, the multimedia file type includes an audio file, a video file or an image file, and the file information includes a bitrate or a pixel.

In another aspect, the present invention provides a storage medium for storing a computer program. The computer program includes a plurality of program codes that can be loaded to an electronic device to enable the electronic device to execute the method for displaying an icon of a multimedia file as described above.

Embodiments of the present invention first obtain the file information of the multimedia file and determine the file quality grade corresponding to the file information, and then adjust and display the icon correspondingly. As such, the user can determine the file quality grade of each multimedia file directly from its icon, thereby quickly choosing or opening the multimedia file that meets the file quality requirement.

In order to make the aforementioned and other features and advantages of the present invention more comprehensible, embodiments accompanied with figures are described in detail below.

DESCRIPTION OF THE EMBODIMENTS

Exemplary embodiments of the present invention will be described below in more detail with reference to the accompanying drawings. The present invention may, however, be embodied in different forms and should not be constructed as limited to the exemplary embodiments set forth herein. Rather, these exemplary embodiments are provided so that this disclosure will be thorough and complete, and will fully convey the scope of the present invention to those skilled in the art.

Figure 1:
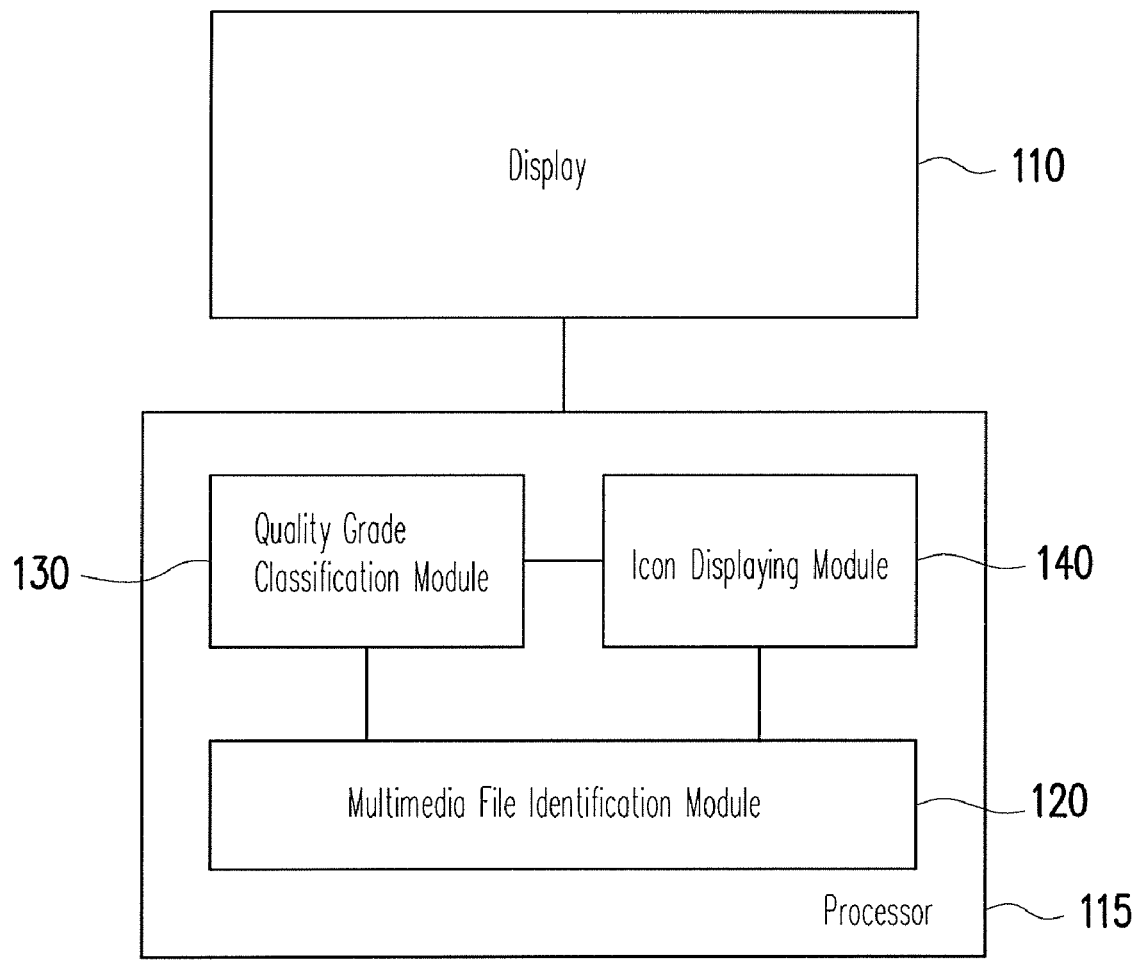
FIG. 1 is a block diagram of an apparatus for displaying an icon of a multimedia file according to one embodiment of the present invention.

FIG. 1 is a block diagram of an apparatus for displaying an icon of a multimedia file according to one embodiment of the present invention. Referring to FIG. 1, in the present embodiment, the displaying apparatus 100 for the multimedia file icon can be incorporated into any electronic device capable of storing and playing multimedia files, such as, a personal computer, a notebook computer, a smartphone, or a personal digital assistant. Thus, the displaying apparatus is not limited to be used in a particular electronic device.

As shown in FIG. 1, the displaying apparatus 100 for the multimedia file icon includes a display 110 and a processor 115. The processor 115 includes a multimedia file identification module 120, a quality grade classification module 130, and an icon displaying module 140. The display 110 is used to present a user interface, such as, a file folder window of the electronic device, or an operation screen of playing software installed in the electronic device for playing the multimedia files. The processor 115 is used to process the multimedia file icon. The function of the various modules of the processor 115 is described below in greater detail.

In the displaying apparatus 100 for the multimedia file icon, the multimedia file identification module 120 is coupled to the quality grade classification module 130 and icon displaying module 140, and may also be coupled to a storage device (not shown) that stores multiple files to determine whether the files in the storage device are multimedia files. In one embodiment, the storage device is, for example, the own hard disk of the electronic device. In an alternative embodiment, the storage device may be storage medium such as an optical disk or digital video disk. The multimedia file identification module 120 is coupled to the optical disk or digital video disk through an optical disk driver of the electronic device to thereby determine whether the files stored on the disk are multimedia files.

The quality grade classification module 130 determines the quality grade of the multimedia files according to different multimedia file types. The icon displaying module 140 coupled with the quality grade classification module 130 adjusts the icons of the multimedia files according to their file quality grade and presents the adjusted icons on the user interface.

Operation of the display apparatus 100 of the multimedia file icon allows the user to view the multimedia file icon corresponding to the file quality grade on the user interface presented on the display 110. As such, files that meet the quality requirement can be readily chosen from a wide variety of multimedia files. The operation sequence of the displaying apparatus 100 for the multimedia file icon is described in greater detail in the embodiments below.

Figure 2:
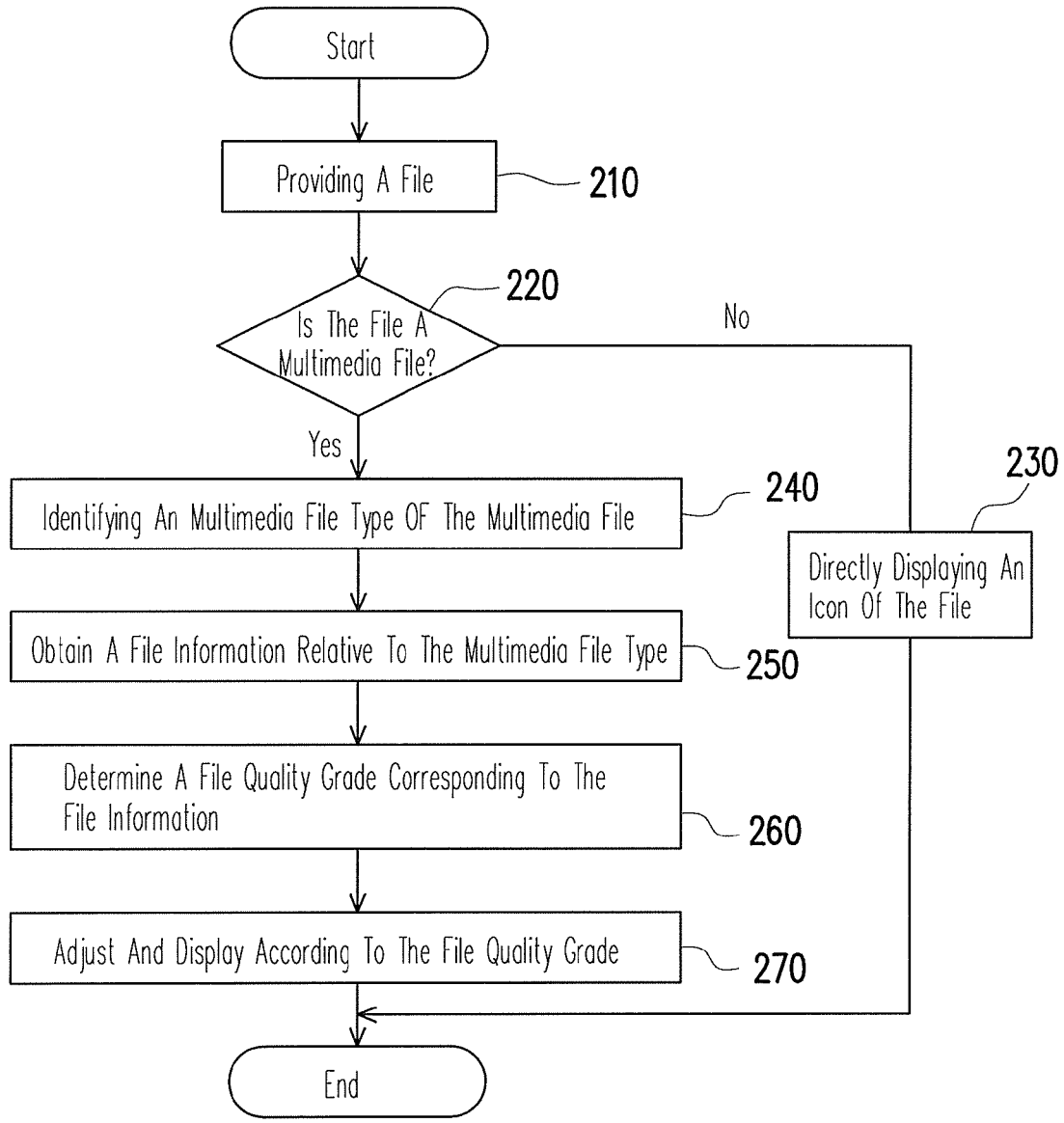
FIG. 2 is a flow chart of a method for displaying an icon of a multimedia file according to one embodiment of the present invention.

FIG. 2 is a flow chart of a method for displaying an icon of a multimedia file according to one embodiment of the present invention. Referring to FIGS. 1 and 2, a file is initially provided to the displaying apparatus 100 for the multimedia file icon at step 210. In the present embodiment, step 210 may be implemented, for example, by providing a file stored in the storage device to the displaying apparatus 100 for the multimedia file icon. The storage device is coupled to the multimedia file identification module 120.

Next, the multimedia file classification module 120 determines whether the provided file is a multimedia file at step 220. If it is not a multimedia file, at step 230, the icon displaying module 140 directly displays the icon of the file on the user interface which is to be presented on the display 110.

However, if the multimedia file identification module 120 determines the file is a multimedia file, the quality grade classification module 130 analyzes the file, at the next step, to initialize a determination of the file quality grade. In determining the file quality grade, the quality grade classification module 130 first identifies the file type of the multimedia file at step 240. In the present embodiment, the multimedia file type includes an audio file, a video file, or an image file. In an alternative embodiment, the multimedia file type further includes an audio track recorded on an optical disk or a digital video disk.

Next, at step 250, the quality grade classification module 130 obtains a file information relative to the multimedia file type. For example, when the multimedia file type is an audio file or video file, the quality grade classification module 130 analyzes the multimedia file to obtain its bitrate which is to be used as its file information. When the multimedia file type is an image file, the quality grade classification module 130 determines the pixel of the image file as its file information. In other words, the file information obtained by the quality grade classification module 130 varies with the different types of the multimedia files.

After obtaining the file information of the multimedia file, at step 260, the quality grade classification module 130 compares the file information to at least one quality classification threshold to determine the file quality grade corresponding to the file information. In the present embodiment, the quality classification threshold also varies with the different types of the multimedia files. The quality grade classification module 130 compares the quality classification threshold corresponding to the multimedia file type to the file information.

Finally, at step 270, the icon displaying module 140 adjusts the icon according to the file quality grade determined by the quality grade classification module 130 and displays the adjusted icon on the user interface which is presented by the display 110, thus allowing the user to view the content of the user interface. The icon displaying module 140 adjusts the resolution of the icon according to the file quality grade. In other words, the higher quality grade the multimedia file has, the higher resolution the icon has. The multimedia files having a lower quality grade correspond to icons having a lower resolution.

In the above embodiment, after the quality grade classification module 130 determines the file quality grade of the multimedia file, the icon displaying module 140 displays the icon corresponding to the file quality grade on the user interface. Therefore, when viewing the user interface presented on the display 110, the user can readily distinguish the quality of the audio files, video files or image files from the icons, thereby enhancing the efficiency of choosing or opening the multimedia file.

Figure 3:
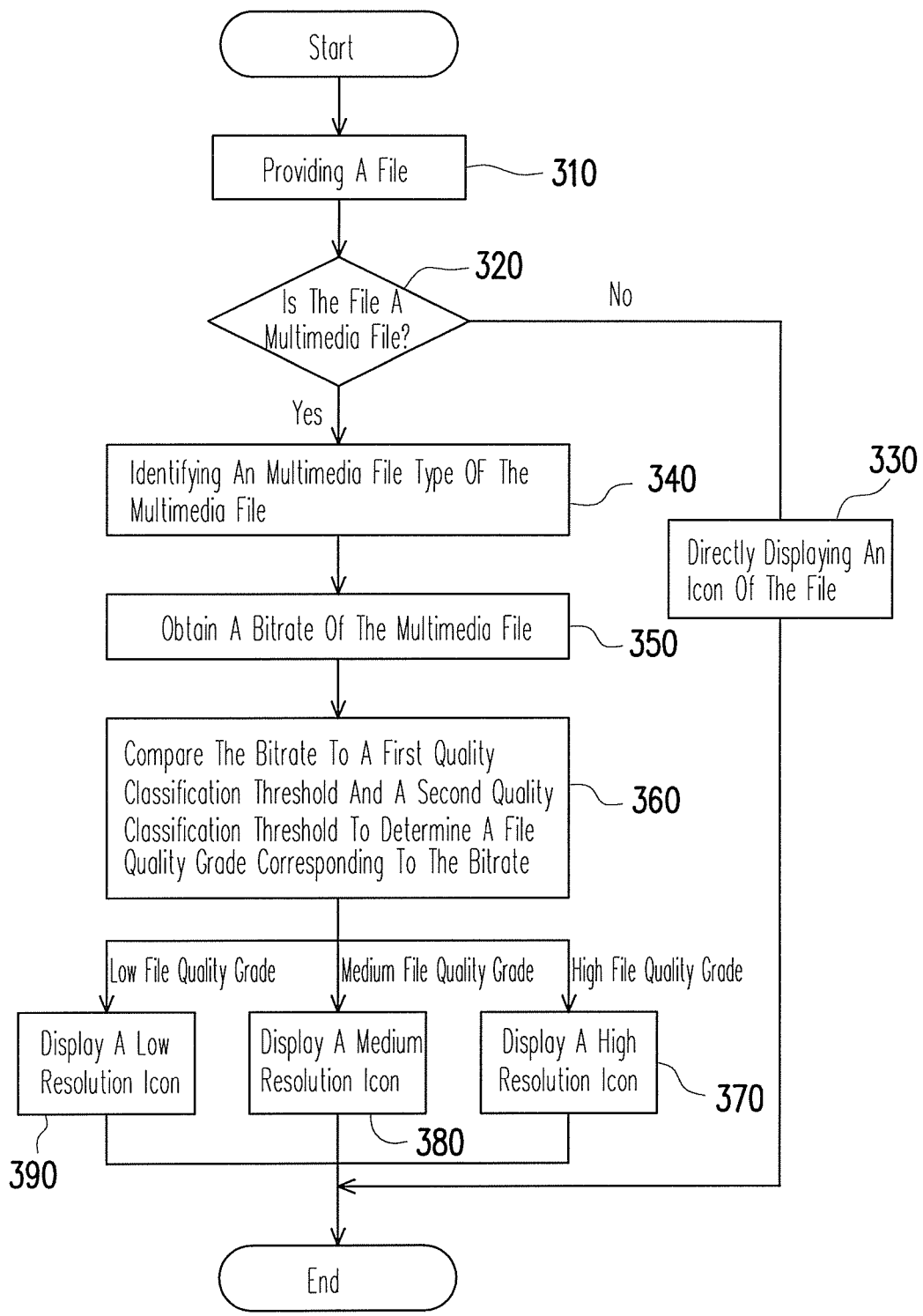
FIG. 3 is a flow chart of a method for displaying an icon of a multimedia file according to another embodiment of the present invention.

FIG. 3 is a flow chart of a method for displaying an icon of a multimedia file according to another embodiment of the present invention. Determining the file quality grade by the quality grade classification module 130 and adjusting the icon by the icon displaying module 140 according to the file quality grade are described in greater detail in this embodiment. Referring to FIG. 1 and FIG. 3, steps 310 to 340 of FIG. 3 are the same as or similar to steps 210 to 240 of FIG. 2, which all involve determining, upon a file being provided, whether the file is a multimedia file, and directly displaying the file icon if the file is not a multimedia file and identifying the multimedia file type if the file is a multimedia file. Therefore, these steps are not repeated herein.

In the present embodiment, assuming after determining the file to be a multimedia file, the quality grade classification module 130 proceeds to determine that the multimedia file type is an audio file (e.g., a MP3 file). At step 350, the quality grade classification module 130 then obtains the file information corresponding to the multimedia file type, i.e., the bitrate of the audio file. Specifically, the international standards organization (ISO) defines different standards for various multimedia files and, therefore, the quality grade classification module 130 may analyze the multimedia file according to the ISO standard to thereby obtain the bitrate information.

For ease of illustration, it is assumed that a first quality classification threshold and a second quality classification threshold are preset for the audio file type to divide all audio files into three main classifications, i.e., a high file quality grade, a medium file quality grade, and a low file quality grade. Therefore, at step 360, the quality grade classification module 130 compares the bitrate of the audio file to the first quality classification threshold and the second quality classification threshold to determine the file quality grade of the audio file.

For example, if the first quality classification threshold and the second quality classification threshold are 192 Kbps and 96 Kbps, respectively, an MP3 file with a bitrate higher than 192 Kbps will be considered as having a high file quality grade and therefore the icon displaying module 140 will display a high resolution icon on the user interface at step 370. However, if an MP3 file has a bitrate between 192 Kbps and 96 Kbps, the MP3 file will be considered as having a medium file quality grade and therefore the icon displaying module 140 will display a medium resolution icon on the user interface at step 380. In other words, the higher the MP3 file quality is, the higher the resolution of the icon correspondingly displayed on the user interface is. As such, when viewing the user interface presented on the display 110, the user can readily determine the MP3 file quality based on whether the icon is clear or not.

It should be noted, however, that the first quality classification threshold and the second threshold are only examples for the purpose of description only. In other words, the number of the quality classification thresholds and the value of each quality classification threshold can be defined based on the user needs, habits and the multimedia file types and should not be limited to any particular embodiments described herein.

It should also be noted that the displaying method for the multimedia file icon can be carried out in any electronic devices equipped with a processor. To carry out the displaying method for the multimedia file icon of the above embodiment in an electronic device, a program consisting of multiple program codes for implementing the above-illustrated displaying method is firstly compiled. A computer readable storage medium (e.g., an optical disk, a magnetic disk or a removable hard disk) is used to store the program. The program is loaded to the electronic device, and the displaying method can thus be implemented in the electronic device.

In summary, in the method and apparatus for displaying a multimedia file icon, and a storage medium thereof, a file quality grade is determined according to a file information relative to a multimedia file and a resolution of the file icon is processed according to the file quality grade. Therefore, the user can quickly determine the file quality grade based on whether the icon is clear or not. As such, not only the multimedia file icon can be displayed in a greater diversity of manners, but the present invention also provides a more intuitive manner of displaying the file quality grade of the multimedia file, thereby facilitating the user choosing or opening the multimedia file.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for displaying an icon of a multimedia file on a user interface, the method comprising:
    determining a file quality grade of the multimedia file; and
    wherein the step of determining the file quality grade of the multimedia file comprises:
    identifying a multimedia file type of the multimedia file;
    obtaining a file information relative to the multimedia file type; and
    comparing the file information to at least one of a plurality of file quality grade classification thresholds to determine the file quality grade corresponding to the file information; wherein the file quality grade comprises a plurality of discrete file information categories with each category having a different quality range of the file information; and
    adjusting and displaying the icon according to the file quality grade.

2. The method for displaying an icon of a multimedia file according to claim 1, wherein before the step of determining the file quality grade of the multimedia file, the method further comprises:
    providing a file;
    determining whether the file is the multimedia file;
    directly displaying the icon of the file if the file is not the multimedia file; and
    analyzing the file to initiate determining of the file quality grade if the file is the multimedia file.

3. The method for displaying an icon of a multimedia file according to claim 1, wherein the step of adjusting and displaying the icon according to the file quality grade comprises:
adjusting a resolution of the icon according to the file quality grade; and
displaying the adjusted icon on the user interface.

4. The method for displaying an icon of a multimedia file according to claim 1, wherein the multimedia file type comprises one of an audio file, a video file and an image file.

5. The method for displaying an icon of a multimedia file according to claim 1, wherein the file information comprises one of a bitrate and a pixel.

6. An apparatus for displaying an icon of a multimedia file, comprising:
a display for presenting a user interface; and
a processor coupled to the display, the processor comprising:
a quality grade classification module for determining a file quality grade of the multimedia file by identifying a multimedia file type of the multimedia file, obtaining a file information relative to the multimedia file type, and comparing the file information to at least one of a plurality of file quality grade classification thresholds to determine the file quality grade corresponding to the file information; wherein the file quality grade comprises a plurality of discrete file information categories with each category having a different quality range of the file information; and
an icon displaying module coupled to the quality grade classification module for adjusting the icon of the multimedia file and displaying the icon on the user interface.

7. The apparatus for displaying an icon of a multimedia file according to claim 6, wherein the processor further comprises a multimedia file identification module coupled to the quality grade classification module and the icon displaying module for determining whether the file is the multimedia file, when the multimedia file identification module determines the file is not the multimedia file, the icon displaying module directly displays the icon corresponding to the file, when the multimedia file identification module determines the file is the multimedia file, the quality grade classification module analyzes the file to initiate determining of the file quality grade.

8. The apparatus for displaying an icon of a multimedia file according to claim 6, wherein the icon displaying module adjusts a resolution of the icon according to the file quality grade and displays the adjusted icon on the user interface.

9. The apparatus for displaying an icon of a multimedia file according to claim 6, wherein the multimedia file type comprises one of an audio file, a video file and an image file.

10. The apparatus for displaying an icon of a multimedia file according to claim 6, wherein the file information comprises one of a bitrate and a pixel.

11. A storage medium for storing a computer program, the computer program comprising a plurality of program codes to be loaded to an electronic device to enable the electronic device to execute a method for displaying an icon of a multimedia file, the method comprising:
determining a file quality grade of the multimedia file; and
adjusting and displaying the icon on a user interface according to the file quality grade; wherein the step of determining a file quality grade of the multimedia file comprises:
identifying a multimedia file type of the multimedia file;
obtaining a file information relative to the multimedia file type; and
comparing the file information to at least one of a plurality of file quality grade classification thresholds to determine the file quality grade corresponding to the file information; wherein the file quality grade comprises a plurality of discrete file information categories with each category having a different quality range of the file information.

12. The storage medium according to claim 11, wherein before the step of determining the file quality grade of the multimedia file, the method further comprises:
providing a file;
determining whether the file is the multimedia file;
directly displaying the icon of the file if the file is not the multimedia file; and
analyzing the file to initiate determining of the file quality grade if the file is the multimedia file.

13. The storage medium according to claim 11, wherein the step of adjusting and displaying the icon according to the file quality grade comprises:
adjusting a resolution of the icon according to the file quality grade; and
displaying the adjusted icon on the user interface.

14. The storage medium according to claim 11, wherein the multimedia file type comprises one of an audio file, a video file and an image file.

15. The storage medium according to claim 11, wherein the file information comprises one of a bitrate and a pixel.

* * * * *